United States Patent

[11] 3,633,721

[72] Inventors Kurt Werner;
Lothar Kuhn, both of Frankfurt am Main, Germany
[21] Appl. No. 885,939
[22] Filed Dec. 17, 1969
[45] Patented Jan. 11, 1972
[73] Assignee Adlerwerke vorm. Heinrich Kleyer A.G.
Frankfurt am Main, Germany

[54] CARRIAGE DRAW AND ROLLER BEARING MONITORING DEVICE
2 Claims, 5 Drawing Figs.
[52] U.S. Cl. .................................................. 197/60, 197/62, 197/68, 197/69
[51] Int. Cl. ...................................................... B41j 19/00
[50] Field of Search ........................................... 197/60, 62, 65, 68, 69

[56] References Cited
UNITED STATES PATENTS
1,375,358  4/1921  Bridges ........................ 197/69
956,471  4/1910  Bloomfield .................. 197/65
1,483,330  2/1924  Broman ....................... 197/60
FOREIGN PATENTS
346,766  1/1922  Germany .................... 197/68

Primary Examiner—Ernest T. Wright, Jr.
Attorney—Joseph R. Spalla

ABSTRACT: A motive source for yieldably urging a roller bearing supported typewriter carriage in letter feed direction characterized in that the roller bearing retainer serves as an anchor for linear springs extending therefrom in opposite directions to frame and carriage anchors. The springs act as a single carriage feed spring; the connection to the intermediate anchor point provided by the retainer also serves to control and maintain the position of the retainer intermediate opposite frame and carriage spring anchors.

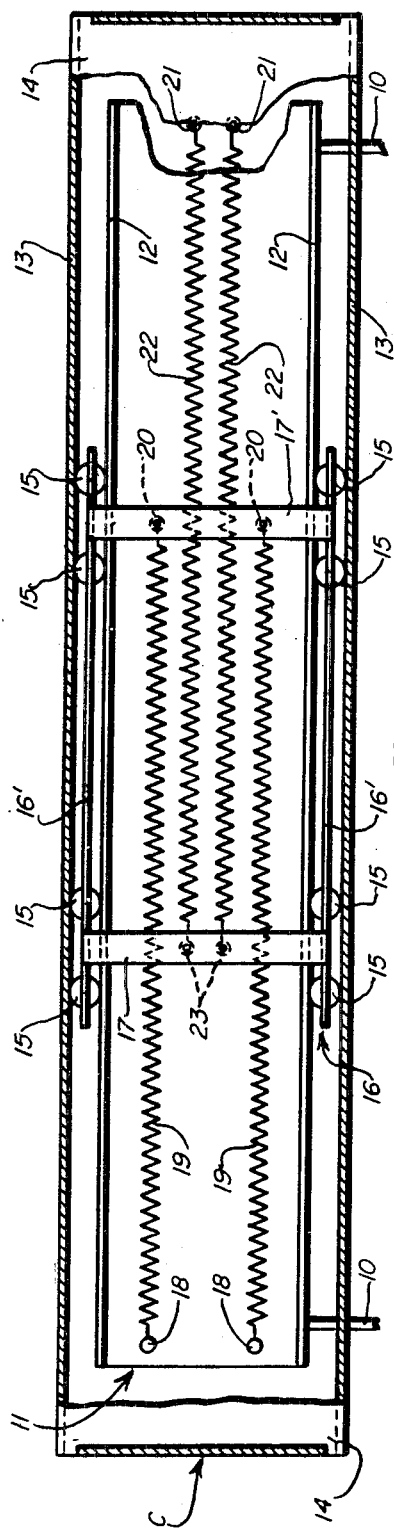

CARRIAGE DRAW AND ROLLER BEARING MONITORING DEVICE

BACKGROUND OF THE INVENTION

Platen-supporting or single-element-type head-supporting carriages of present-day business machines, such as typewriters, are usually yieldably urged in letter feed direction by a spiral spring motor mounted in the machine frame and connected to the carriage by a drawband. Spring motors are generally expensive.

The carriage of such machines are also conventionally supported by roller elements or bearings guided within tracks formed by frame and carriage mounted rails. Theoretically, if the rolling elements experienced pure rolling motion in response to carriage movement the distance traversed by the rolling elements would be half the distance traversed by the carriage. However, as pure rolling motion is not readily attainable, the roller elements translate as well as rotate and thus tend to "creep" toward the ends of the carriage track. To prevent this creeping or translating movement, the prior art has nested the roller elements in cages or retainers which rotatively support a gear which at diametrically opposite points is in mesh with a rack on the carriage rail and a rack on the frame rail thereby to constrain translatory movement of the roller elements thus assuring that the roller elements will always be properly oriented relative to the frame and carriage.

Such gear and rack structures essentially have to be of accurate manufacture and smooth interaction so that the carriage moves smoothly and freely at all times. Also such a structure is costly and is liable to get out of order and interfere with smooth carriage travel.

SUMMARY OF THE INVENTION

According to the invention, a two-stage spring system reached from an anchor point on the frame to an anchor point on the carriage and between its two stages it is connected to a rolling element retainer. The springs of each stage of the two-stage spring system are of substantially identical size, length and spring constant or resilient characteristic. Thus the forces exerted on the retainer are balanced thereby to resiliently urge the retainer, in any position of the carriage, to take up resiliently a midposition between the anchor points where the springs are respectively connected to the frame and the carriage. It is thus evident that the rolling elements will not creep appreciably; they will be constrained to maintain these positions as dictated by theoretical rolling motion. Accordingly they can never roll off the limits of the guideways or become improperly oriented relative to the frame and carriage.

This two-stage spring system when used in association with a typewriter carriage preferably is designed and arranged to be powerful enough not only to monitor the movement of the rolling elements carriage movement, but also to yieldably urge the carriage in letter feed direction when used in combination with a conventional spiral spring motor.

An object of the invention is in the provision of a novel motive source for yieldably moving a typewriter carriage in letter feed direction.

Another object of the invention is to provide simple, effective and economical means to monitor the movement and position of antifriction rolling elements relative to carriage movement and position and particularly to maintain a relationship substantially in conformance with that attainable with pure rolling motion so as to preclude creep of the rolling elements beyond the ends of the guideways.

It is a further object to accomplish the foregoing object in a resiliently active manner which is conducive to smooth travel of the carriage.

A further object of the invention is to accomplish the foregoing objects by simple resiliently distendable means such as spring means and preferably by spring means which are instrumental at the same time to propel the carriage for carriage feed advancement.

A still further object of the invention is in the provision of a carriage support structure which assures that the relative positions of the carriage and antifriction elements are maintained in simple manner without necessity for racks and gears. In the drawing:

FIG. 1 is a schematic fragmentary plan view of a typewriter carriage movably supported on an underlying frame structure by use of rolling elements which are positionably controlled by the two-stage spring system of the invention;

FIG. 2 is a fractional left-hand side elevation of the parts seen in FIG. 1 and showing specific guideway details;

FIG. 3 is a plan view of a modified form of a rolling element retainer; and

FIGS. 4 and 5 are schematic views illustrating the spring means of the invention relatedly in reference to two different positions of the carriage.

Referring now to the drawing, wherein like reference characters designate like or corresponding parts throughout the several views, there is shown in FIGS. 1 and 2 a machine frame 10 which has a plate 11 fixed thereto which has opposite parallel edges folded to form outwardly facing guides, tracks or rails 12. A carriage generally designated by reference character C is secured to a plate or truck 14 whose opposite parallel edges are folded inwardly to form guides or tracks 13 which together with guides 12 form raceways for carriage supporting antiroller elements in the form of ball roller bearings 15. The ball bearings 15 are accommodated in perforations of a ball retainer or cage generally designated by reference numeral 16. Such ball retainer 16 consists of two parallel strips or webs 16', located between each pair of adjacent guides 12 and 13. The strips 16' are bridged or joined to one another by two transverse struts 17 and 17'.

Two contractile coil springs 19 are attached to pins 18 on the plate 11 and extend parallel to the direction of carriage travel to pins 20 on the strut 17' of the cage 16. Parallel and inwardly between the two springs 19 there extend two contractile springs 22 from pins 23 on the strut 17 to pins 21 and the carriage C. The springs 19 and 22 are of equal size, length and spring constant, and, incidental to carriage movements, their lengths become mutually affected in equal manner and extent. It is further to be noted that all of the springs 19 and 22 are located in a common horizontal plane and within the space between carriage truck 14 and machine frame 11. The lengths of the springs 19 and 22 are also such that they are always under tension at all carriage positions.

In FIG. 1 the carriage C is shown in a midposition, and, as in conventional typewriters, it is yieldably held against leftward (letter feed) movement by an escapement mechanism, not shown. It will be noted that the springs 19 in respect to the springs 22 are overlapping parallel to the direction of the guideways 12 and 13, so that their aggregate total length is adequate so as never to become stretched beyond their elastic limit. In any given position of the carriage C the springs 19 and 22 exert equal force on the retainer 16 in opposite directions and consequently the rolling elements retainer 16 is located always substantially midways between the outwardly extending ends of the springs 19, 22 located at anchor points 18 and 21 respectively.

The springs 19 and 22 may be considered to be a two-stage spring system in which each undergoes an equal change of length which is half the length of any carriage movement, so that incidental to their mutual contractions or distensions they will together positionally monitor the rolling elements retainer 16, and prevent the rolling elements retainer 16 from creeping beyond the ends of the guideways 12, 13.

As hereinbefore stated, the springs 19 and 22 comprising the two-stage spring system may serve to control not only the rolling elements retainer 16 but may, as clearly illustrated in the schematic showings in FIGS. 4 and 5, serve also collectively in the capacity of a carriage feed spring to yieldably urge the carriage C in the letter feed direction shown by arrows 24 in place of the conventional spring motor 25 and drawband 26.

However, where very heavy carriages are employed, it is obvious that the two-stage spring system, if desired, may be provided in conjunction with a feed spring motor 25 and carriage drawband 26, as indicated in phantom lines in FIG. 4. Obviously, in that event the strength of the springs 19, 22 of the two-stage system may be appreciably reduced.

As shown in FIGS. 1 and 2 of the drawing, the springs 19 and 22 are all in the same plane in which all the rolling elements 15 are contained thereby providing an efficiently acting system. Furthermore, as a group, the springs 19 and 22 are centered between the two pairs of guideways 12 and 13 and thus assures the carriage C will move with a maximum of freedom.

A modified rolling element retainer generally designated by reference number 27 is shown in FIG. 3 and comprises an elongate, generally flat plate 28 which may have lengthwise stiffening ridges 29. Carrier or retainer strips 31 for the rolling elements or balls 32 are joined by webs 33 at opposite midportions and are rectangularly bent off from said webs 33 and reach oppositely lengthwise from such midportion the length of the plate 28. The balls 32 are, as in FIGS. 1 and 2, turnably accommodated in holes of the strips 31. Because the strips 31 reach out oppositely from the midportion of the plate 28, they are somewhat flexible and can adjust themselves readily to the paths afforded between guideways 12, 13 to accommodate any out of parallelism of the raceways. The plate 28 has expanses reaching substantially to the ends of said strips 31 but such expanses are completely free of the strips 31. Pins or protuberances 34 borne at the ends of said web expanses serve to anchor springs 19, 22 thereon which extend lengthwise of the carriage C toward each other for anchorage oppositely on the carriage C and frame 10 as in FIG. 1.

What is claimed is:

1. Mechanism for yieldably urging a business machine carriage relative to a printing point in a letter feed direction comprising
    a frame,
    a carriage,
    said frame-supporting spaced parallel guides,
    said carriage supporting spaced parallel guides facing said frame-supported guides and forming therewith parallel-spaced ball roller bearing raceways,
    a ball roller bearing retainer comprising ball roller bearing strips disposed within each of said raceways and bridging means connecting said strips,
    pairs of spring anchors located on said bridging means and spaced apart in the direction of said raceways,
    a first pair of springs disposed parallel to said raceways tensioned between frame-supported anchors and the pair of said spring anchors farthest therefrom,
    a second pair of springs located outwardly of said first pair of springs tensioned between carriage-supported anchors and the pair of said spring anchors farthest therefrom,
    said pairs of springs being of equal lengths and spring characteristics whereby the forces acting on said bearing retainer are balanced.

2. Mechanism as recited in claim 1 wherein said strips are resilient.

* * * * *